(12) United States Patent
Shellhammer

(10) Patent No.: US 8,867,638 B2
(45) Date of Patent: Oct. 21, 2014

(54) VARIABLE-LENGTH CYCLIC PREFIXES IN OFDM COAXIAL COMMUNICATIONS

(75) Inventor: Stephen J. Shellhammer, Ramona, CA (US)

(73) Assignee: QUALCOMM Incorporated, San Diego, CA (US)

( * ) Notice: Subject to any disclaimer, the term of this patent is extended or adjusted under 35 U.S.C. 154(b) by 149 days.

(21) Appl. No.: 13/610,745

(22) Filed: Sep. 11, 2012

(65) Prior Publication Data

US 2013/0272435 A1  Oct. 17, 2013

Related U.S. Application Data

(60) Provisional application No. 60/624,971, filed on Apr. 16, 2012.

(51) Int. Cl.
*H04K 1/10* (2006.01)
*H04L 27/28* (2006.01)

(52) U.S. Cl.
USPC .......................... 375/260; 307/203; 307/208

(58) Field of Classification Search
CPC .................. H04L 27/2607; H04L 27/2613
USPC .......................... 375/257, 260; 370/203–211
See application file for complete search history.

(56) References Cited

U.S. PATENT DOCUMENTS

| | | |
|---|---|---|
| 7,295,518 B1 | 11/2007 | Monk et al. |
| 8,121,023 B2 | 2/2012 | Laudel et al. |
| 2010/0061403 A1 | 3/2010 | Mueller |
| 2011/0058813 A1 | 3/2011 | Boyd et al. |
| 2012/0033972 A1 | 2/2012 | Dai |
| 2012/0195346 A1* | 8/2012 | Laudel et al. ................. 375/131 |

FOREIGN PATENT DOCUMENTS

WO  WO 2004/045125 A2  5/2004

OTHER PUBLICATIONS

Avi Kliger et al: "OFDM Numerology for EPOC; kliger_01_0113", IEEE Draft; KLIGER_01_0113, IEEE-SA, Piscataway, NJ, USA, vol. 802.3bn, Jan. 29, 2013, pp. 1-20, XP068047297, [retrieved on Jan. 29, 2013].
International Search Report and Written Opinion—PCT/US2013/035850—ISA/EPO—Jul. 15, 2013.
"Operating the EPON protocol over Coaxial Distribution Networks Call for Interest," IEEE 802.3 Ethernet Working Group, Atlanta, GA, Nov. 8, 2011.
Schmitt, Matt, "Cable Network Overview," Mar. 2012 IEEE 802.3 meeting, Retrieved from http://grouper.ieee.org/groups/802/3/epoc/public/mar12/schmitt_01_0312.pdf.

* cited by examiner

*Primary Examiner* — Curtis Odom
(74) *Attorney, Agent, or Firm* — Mahamedi Paradice LLP

(57) ABSTRACT

A coax network unit (CNU) is coupled to a coax line terminal (CLT) by a cable plant. In a discovery mode of operation, the CNU receives from the CLT one or more message packets that include one or more orthogonal frequency-division multiplexing (OFDM) symbols with cyclic prefixes of a first length. In a normal mode of operation subsequent to the discovery mode, the CNU receives data packets comprising OFDM symbols from the CLT. The OFDM symbols of the received data packets have cyclic prefixes of a second length that is less than the first length.

29 Claims, 8 Drawing Sheets

VARIABLE-LENGTH CYCLIC PREFIXES IN OFDM COAXIAL COMMUNICATIONS

RELATED APPLICATION

This application claims priority to U.S. Provisional Patent Application No. 61/624,971, titled "Variable-Length Cyclic Prefixes in OFDM Coaxial Communications," filed Apr. 16, 2012, which is hereby incorporated by reference in its entirety.

TECHNICAL FIELD

The present embodiments relate generally to communication systems, and specifically to OFDM communications over coaxial cable plants.

BACKGROUND OF RELATED ART

A network may use both optical fiber and coaxial cable (coax) for respective links. For example, the portions of the network that use optical fiber may be implemented using the Ethernet Passive Optical Network (EPON) protocol, and the EPON protocol may be extended over coaxial cable plants. The EPON protocol as implemented over coax is called EPoC. The physical layer (PHY) of such a network may use orthogonal frequency-division multiplexing (OFDM) and/or orthogonal frequency division multiple access (OFDMA).

Signals transmitted in a particular cable plant are distorted by micro-reflections that occur in the coax communication channel. The delay and amplitude of these micro-reflections depend on the specific cable plant. Also, in a system using frequency-division duplexing (FDD), the amplitude and the delay spread of the micro-reflections may be different for the different frequencies that are used for downstream and upstream communications. For example, the amplitude and delay spread of the micro-reflections may be greater at the low frequencies used for upstream transmission than at the higher frequencies used for downstream transmission.

In an OFDM PHY before each symbol there is a cyclic prefix to deal with the impact of the delay spread of the communication channel, which in a cable plant is due to the micro-reflections. If the OFDM cyclic prefix is long, however, it leads to either long OFDM symbols or high cyclic prefix overhead.

Accordingly, there is a need for efficient cycle prefix schemes in OFDM systems with coax communication channels.

BRIEF DESCRIPTION OF THE DRAWINGS

The present embodiments are illustrated by way of example and are not intended to be limited by the figures of the accompanying drawings.

Like reference numerals refer to corresponding parts throughout the drawings and specification.

DETAILED DESCRIPTION

Embodiments are disclosed in which cyclic prefixes of varying lengths are used in coax OFDM communications.

In some embodiments, a coax network unit coupled to a coax line terminal by a cable plant operates in a discovery mode and a normal mode. In the discovery mode, the coax network unit receives from the coax line terminal one or more message packets that include one or more orthogonal frequency-division multiplexing (OFDM) symbols with cyclic prefixes of a first length. In the normal mode, subsequent to the discovery mode, the coax network unit receives from the coax line terminal data packets that include OFDM symbols with cyclic prefixes of a second length. The second cyclic prefix length is either equal to or less than the first length.

In some embodiments, a coax network unit includes a transmitter to transmit packets including OFDM symbols to a coax line terminal and a receiver to receive packets including OFDM symbols from the coax line terminal. The receiver is configurable to receive one or more message packets including one or more OFDM symbols with cyclic prefixes of a first length during a discovery mode of operation and to receive data packets that include OFDM symbols with cyclic prefixes of a second length during a normal mode of operation. The second cyclic prefix length is either equal to or less than the first length.

In the following description, numerous specific details are set forth such as examples of specific components, circuits, and processes to provide a thorough understanding of the present disclosure. Also, in the following description and for purposes of explanation, specific nomenclature is set forth to provide a thorough understanding of the present embodiments. However, it will be apparent to one skilled in the art that these specific details may not be required to practice the present embodiments. In other instances, well-known circuits and devices are shown in block diagram form to avoid obscuring the present disclosure. The term "coupled" as used herein means connected directly to or connected through one or more intervening components or circuits. Any of the signals provided over various buses described herein may be time-multiplexed with other signals and provided over one or more common buses. Additionally, the interconnection between circuit elements or software blocks may be shown as buses or as single signal lines. Each of the buses may alternatively be a single signal line, and each of the single signal lines may alternatively be buses, and a single line or bus might represent any one or more of a myriad of physical or logical mechanisms for communication between components. The present embodiments are not to be construed as limited to specific examples described herein but rather to include within their scope all embodiments defined by the appended claims.

Figure 1A:
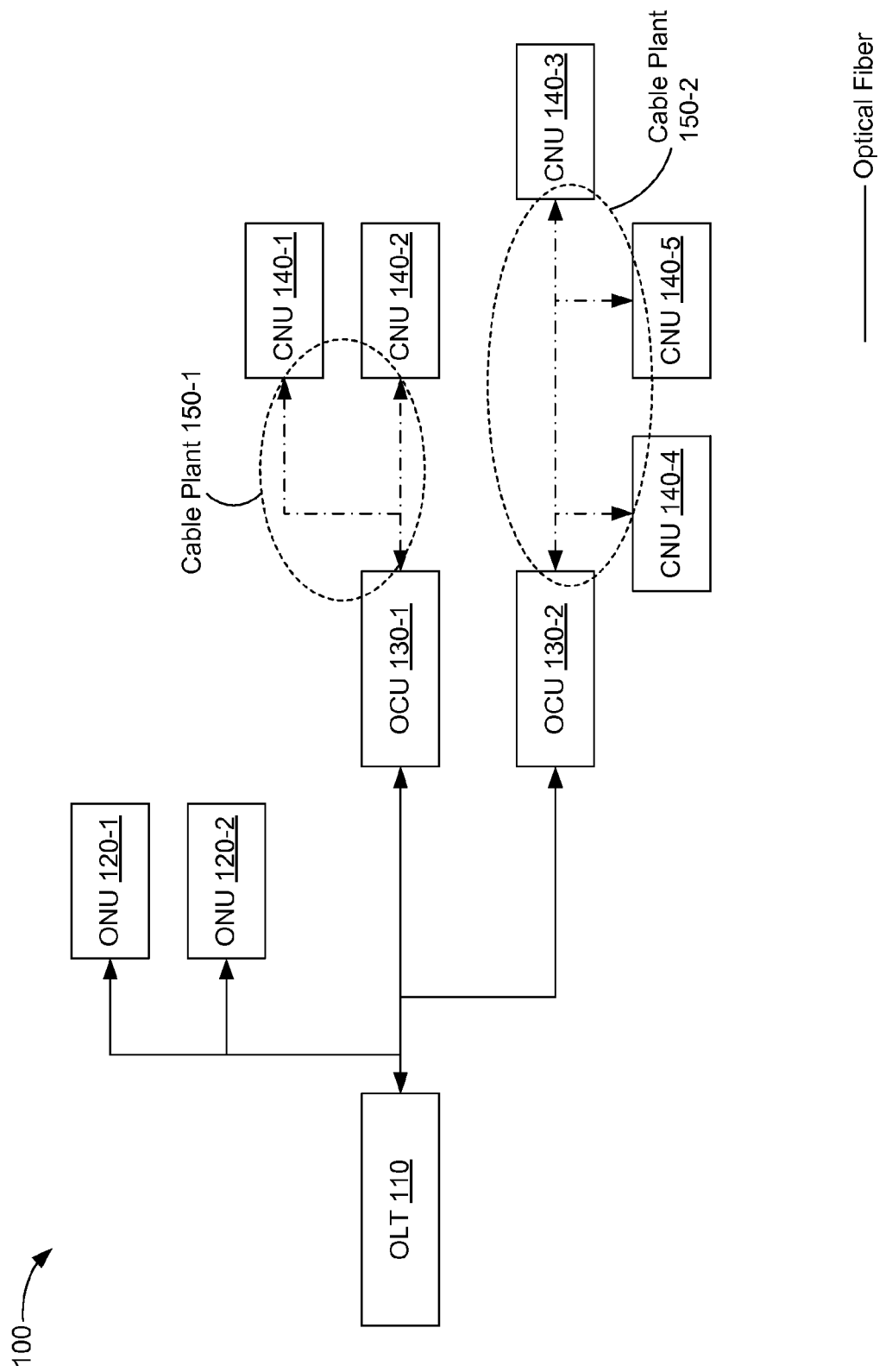
FIGS. 1A and 1B are block diagrams of a network that includes both optical links and coax links in accordance with some embodiments.

FIG. 1A is a block diagram of a network 100 that includes both optical links and coax links in accordance with some embodiments. The network 100 includes an optical link terminal (OLT) 110 coupled to a plurality of optical network units (ONUs) 120-1 and 120-2 via respective optical fiber links. The OLT 110 also is coupled to a plurality of optical-coax units (OCUs) 130-1 and 130-2 via respective optical fiber links. The OCUs 130-1 and 130-2 receive optical signals from the OLT 110 and transmit corresponding electrical signals downstream to coax network units (CNUs) 140-1 through 140-5 via respective coax links. The OCUs 130-1 and 130-2 also receive upstream electrical signals from CNUs 140-1 through 140-5 via respective coax links and transmit corresponding optical signals to the OLT 110. The CNUs 140 transmit the upstream electrical signals at scheduled times specified by the corresponding OCU 130. The OCUs 130-1 and 130-2 thus act as relay stations. In the example of FIG. 1A, a first OCU 130-1 communicates with CNUs 140-1 and 140-2, and a second OCU 130-2 communicates with CNUs 140-3, 140-4, and 140-5. The coax links coupling the first OCU 130-1 with CNUs 140-1 and 140-2 compose a first cable plant 150-1. The coax links coupling the second OCU 130-2 with CNUs 140-3 through 140-5 compose a second cable plant 150-2. A respective coax link may be a passive coax cable, or alternately may include one or more amplifiers and/or equalizers. In some embodiments, the OLT 110, ONUs 120-1 and 120-2, and OCUs 130-1 and 130-2 are implemented in accordance with the Ethernet Passive Optical Network (EPON) protocol.

In some embodiments, the OLT 110 is located at the network operator's headend, the ONUs 120 and CNUs 140 are located at the premises of respective users, and the OCUs 130 are located at the headends of respective cable plants 150 or within respective cable plants 150.

In some embodiments, each ONU 120 and OCU 130 in the network 100 receives data at the same data rate. The ONUs 120 and OCUs 130 each receive all of the packets transmitted by the OLT 110. For example, for unicast transmissions, each ONU 120 receives every packet transmitted by the OLT 110, but selects only the packets addressed to it and discards all packets that are not addressed to it. Likewise, for unicast transmissions the OCUs 130 also receive every packet transmitted by the OLT 110, but filter out the packets not addressed to CNUs 140 on their respective cable plants 150.

Figure 1B:
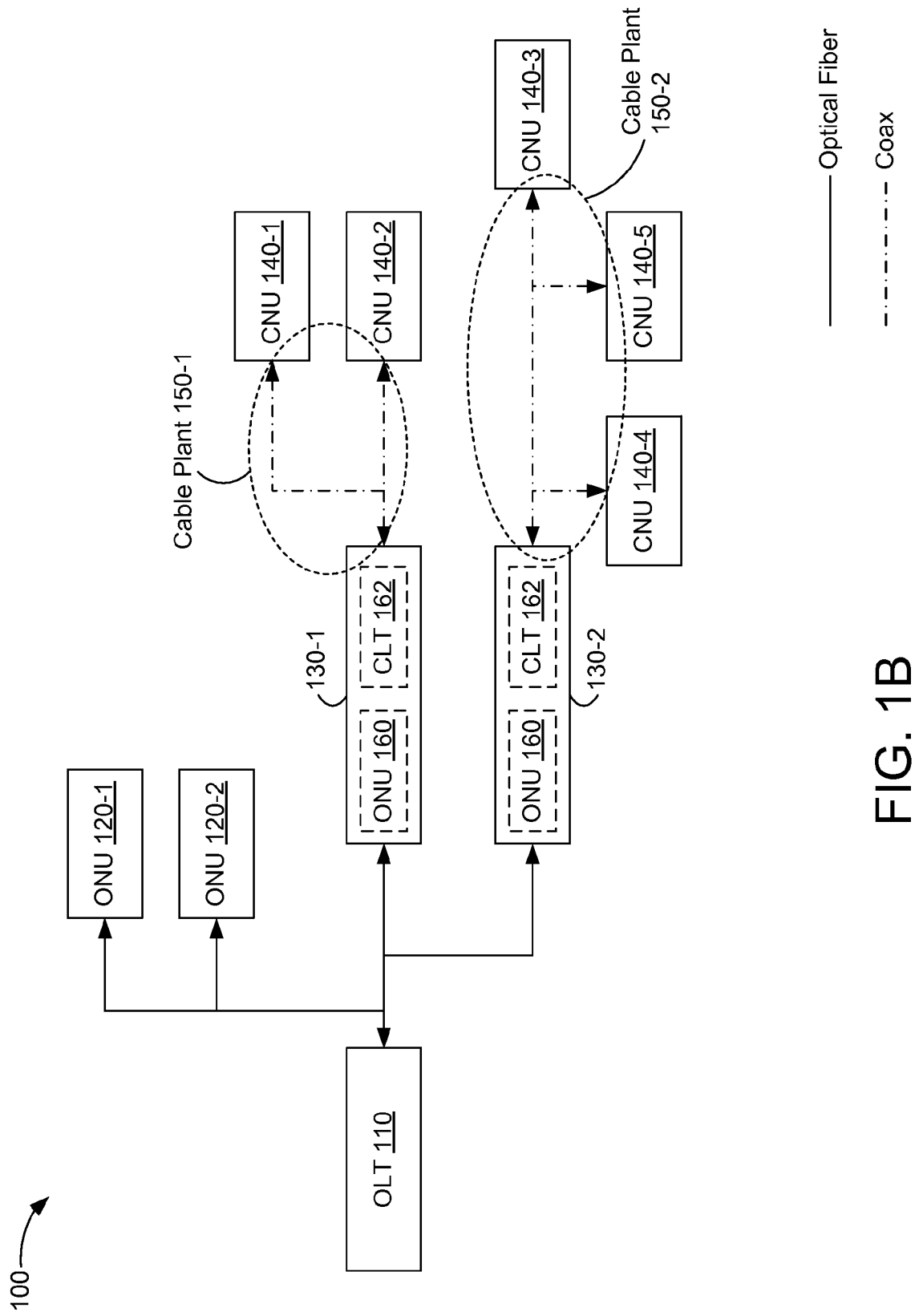

In some embodiments, an OCU 130 includes an ONU 160 coupled with a coax line terminal (CLT) 162 (also referred to as a coax link terminal), as illustrated for the OCUs 130-1 and 130-2 in FIG. 1B. The ONU 160 receives downstream packet transmissions from the OLT 110 and provides them to the CLT 162. The CLT 162 filters out packets that are not addressed to CNUs 140 on its cable plant 150 and forwards the remaining packets to the CNUs 140 on its cable plant 150. The CLT 162 also receives upstream packet transmissions from CNUs 140 on its cable plant 150 and provides these to the ONU 160, which transmits them to the OLT 110. In some embodiments, the ONU 160 and CLT 162 are configured to allow for joint resource allocation between coax and optical links. For example, the ONU 160 and CLT 162 share an implementation of an optical-to-coax convergence layer that performs joint resource allocation.

Figure 1C:
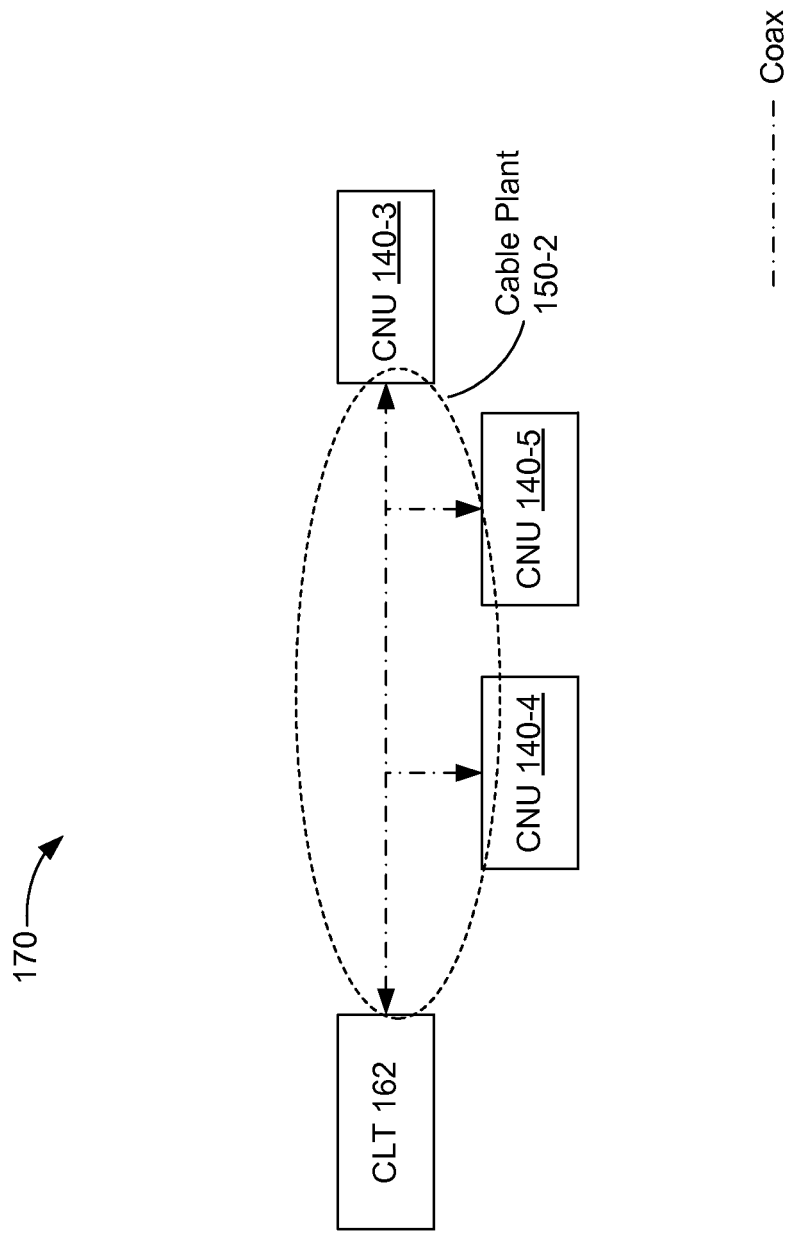
FIG. 1C is a block diagram of a network in which a coax line terminal (CLT) is coupled to a plurality of coax network units (CNUs) by a cable plant in accordance with some embodiments.

FIG. 1C illustrates a network 170 in which a CLT 162 (e.g., the CLT 162 of the OCU 130-2, FIG. 1B) is coupled to the CNUs 140-3 through 140-5 by the cable plant 150-2 in accordance with some embodiments. The system 170 may be part of the system 100 of FIG. 1B. As discussed, the CLT 162 transmits packets downstream to the CNUs 140-3 through 140-5 and receives upstream packet transmissions from the CNUs 140-3 through 140-5.

The coax PHYs (e.g., PHYs 408 and 426, FIGS. 4A-B) of the OCUs 130 (e.g., of the CLTs 162) and CNUs 140 are configurable to transmit and receive OFDM symbols having cyclic prefixes of different lengths (i.e., of different durations). Different cyclic prefix lengths may be chosen for different cable plants 150, depending for example on the degrees of signal impairment (e.g., the delay spreads) caused by micro-reflections in the different cable plants 150. Furthermore, upstream and downstream transmissions in a given cable plant 150 may use cyclic prefixes of different lengths. Also, different cyclic prefix lengths may be used during different modes of operation (e.g., as described below with regard to FIGS. 3A and 3B).

Figure 2A:
FIGS. 2A-2C illustrate OFDM symbols with prefixes of varying lengths in accordance with some embodiments.
Figure 2B:
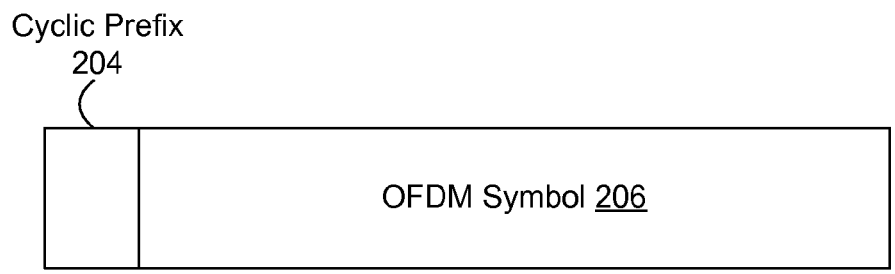
Figure 2C:
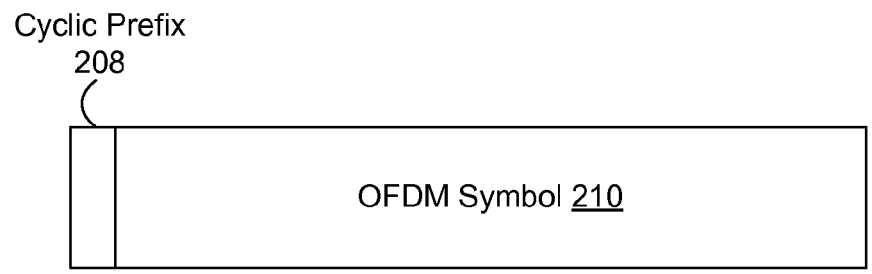

In some embodiments, the coax PHYs of the OCUs 130 and CNUs 140 are configurable to transmit and/or receive OFDM symbols having cyclic prefixes of any length in a predefined set of cyclic prefix lengths. FIGS. 2A-2C illustrate OFDM symbols with prefixes of varying lengths: a first OFDM symbol 202 (FIG. 2A) has a long cyclic prefix 200, a second OFDM symbol 206 has an intermediate-length cyclic prefix 204, and a third OFDM symbol 210 has a short cyclic prefix 208. In one implementation, the intermediate-length prefix 204 is half the length of the long prefix 200, and the short prefix 208 is half the length of the intermediate prefix 204; other implementations are possible. The lengths of the prefixes 200, 204, and 208 form a set of available prefix lengths that the OCUs 130 and/or CNUs 140 may be configured to use for coax transmission and/or reception in various modes of operation. While FIGS. 2A-2C illustrate a set of three available prefix lengths, in some embodiments only two prefix lengths are available, while in other embodiments four or more prefix lengths are available. Also, in some embodiments (e.g., in FDD coax networks) a first set of prefix lengths is available for upstream transmissions from CNUs 140 to a CLT 162 and a second set of prefix lengths is available for downstream transmissions from the CLT 162 to CNUs 140.

The choice of cyclic prefix lengths is made based at least in part on the spread of micro-reflections in a cable plant 150, which is referred to as the delay spread of the channel. A cable plant 150 that has shorter delay spread than another cable plant 150 can accommodate shorter cyclic prefixes than the other cable plant 150. Also, in some FDD embodiments low frequencies are used for upstream transmissions and higher frequencies are used for downstream transmissions. The lower frequencies used for upstream transmissions typically have larger delay spreads than the higher frequencies used for downstream transmissions. Accordingly, in some embodiments the cyclic prefixes used for upstream transmissions are longer than the cyclic prefixes used for downstream transmissions. In one example, prefixes of 4 microseconds, 2 microseconds, and 1 microsecond are available for upstream transmissions, and prefixes of 2 microseconds, 1 microsecond, and 0.5 microseconds are available for downstream transmissions.

In some embodiments, the longest available cyclic prefix length (e.g., the length of long prefix 200, FIG. 2A) is used in a discovery mode as the default prefix length. In the discovery mode, CNUs 140 on a particular cable plant 150 can register with the cable plant's OCU 130. Once the CNUs 140 have registered with the OCU 130, they may be configured to use shorter cyclic prefixes (e.g., the intermediate-length prefix 204 and/or the short prefix 208, FIGS. 2B-2C) for subsequent data communications with the OCU 130 during a normal mode of operation.

Figure 3A:
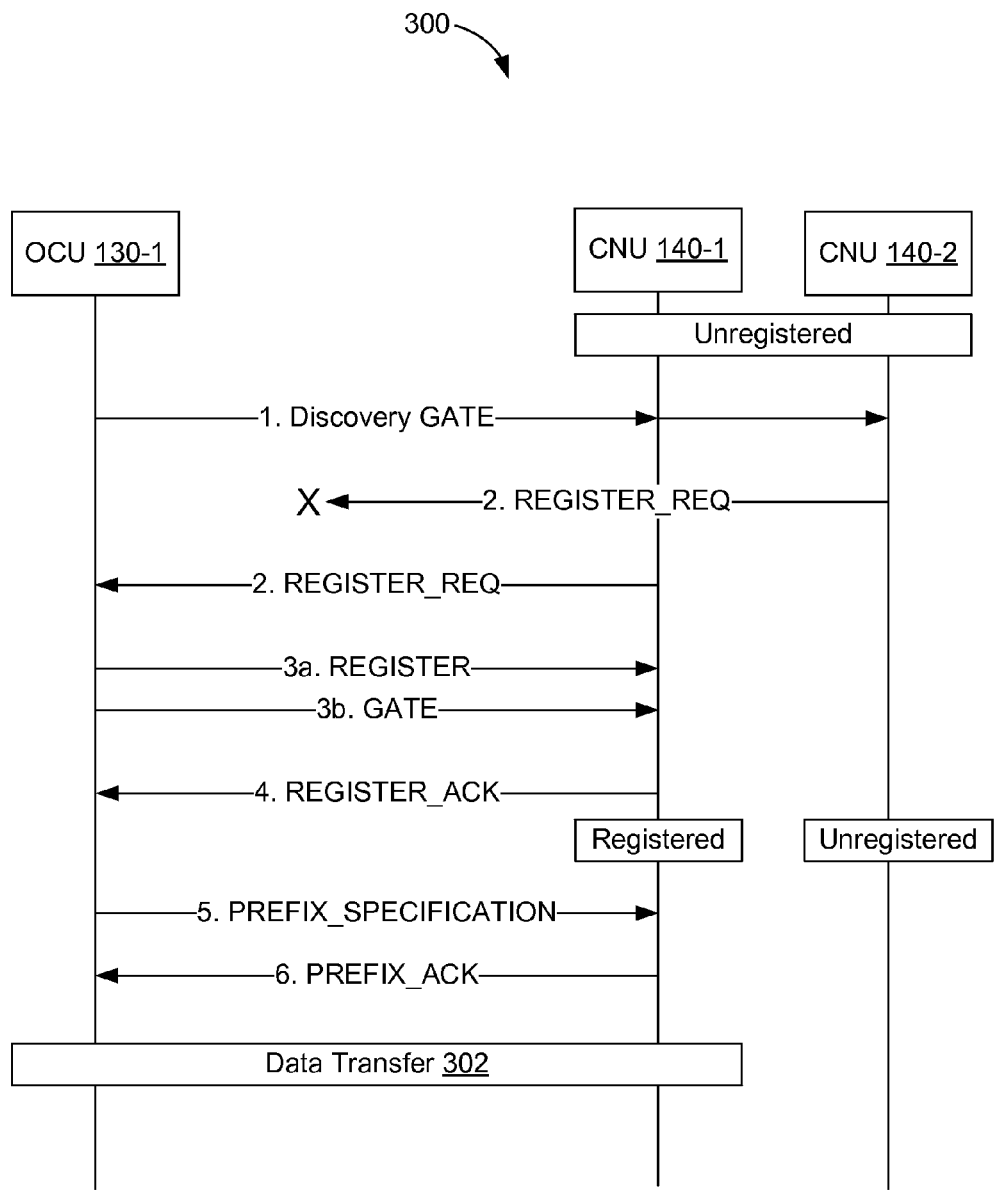
FIGS. 3A-3B illustrate an auto-discovery procedure performed during a discovery mode of operation, followed by data transfer during a normal mode of operation, in accordance with some embodiments.

FIG. 3A illustrates a process 300 in which an auto-discovery procedure (e.g., steps 1-4) is performed during discovery mode, followed by data transfer 302 during a normal mode of operation, in accordance with some embodiments. The auto-discovery procedure is performed, for example, during a periodic discovery window when the CLT 162 (FIGS. 1B-1C) exits the normal operating mode and enters discovery mode. At the beginning of the auto-discovery procedure, CNU 140-1 and CNU 140-2 are both unregistered with the OCU 130-1, and thus are also unregistered with the OLT 110 (FIGS. 1A-1B). The OCU 130-1 periodically distributes special GATE messages (e.g., discovery GATE) to trigger registration of unregistered CNUs 140. At step 1 of the procedure, the OCU 130-1 distributes one of these discovery GATE messages. At step 2, unregistered CNUs 140-1 and 140-2 attempt to register, competing for upstream transmission by replying with a registration request (REGISTER_REQ) message. (A similar message can also be issued by a CNU 140 to unregister.) In the example of FIG. 3A, the CNU 140-1 succeeds in transmitting its REGISTER_REQ message to the OCU 130-1, but the CNU 140-2 fails. The OCU 130-1 decodes the REGISTER_REQ message from the CNU 140-1 and replies to the CNU 140-1 with a registration (REGISTER) message that assigns a unique logical link ID (LLID) to the CNU 140-1 (step 3a), and immediately sends a unicast GATE message to the CNU 140-1 (step 3b). (The OCU 130-1 can also instruct the CNU 140-1 to unregister.) The CNU 140-1 replies with an acknowledgment message (REGISTER_ACK, step 4) to complete registration (or with a non-acknowledgment message (NACK) if registration fails). At this point, the CNU 140-1 is registered with the OCU 130-1, but the CNU 140-2 remains unregistered.

Each of the message packets in steps 1-4 is sent using one or more OFDM symbols having a relatively long cyclic prefix (e.g., the longest available cyclic prefix). For example, each message packet is sent using an OFDM symbol 202 with corresponding long prefix 200 (FIG. 2A). In some embodiments, the downstream messages of steps 1, 3a, and 3b are sent using prefixes of the longest available length for downstream transmissions, and the upstream message of step 2 is sent using prefixes of the longest available length for upstream transmissions.

In some embodiments, the downstream messages in steps 1 and 3 originate from the OLT 110 (FIGS. 1A-1B) and are forwarded to the CNUs 140-1 and 140-2 by the OCU 130-1. Also, in some embodiments the OCU 130-1 forwards the upstream messages in steps 2 and 4 to the OLT 110, to allow the CNUs 140-1 and 140-2 to be registered with the OLT 110 as well as with the OCU 130-1.

After the CNU 140-1 has registered, the OCU 130-1 sends one or more messages (PREFIX_SPECIFICATION) to the CNU 140-1 specifying the cyclic prefix length(s) to be used for data transfers between the OCU 130-1 and CNU 140-1 (step 5). Each specified prefix length may be shorter than the default prefix length used during discovery, or alternatively may be equal to the default prefix length, depending on the cable plant. In some embodiments, these one or more messages are operations, administration, and maintenance (OAM) messages transmitted in a normal mode of operation after the discovery mode has ended. The CNU 140-1 responds to each of these messages with an acknowledgment (PREFIX_ACK) message (step 6). In some embodiments, different prefix lengths are used for upstream and downstream transmissions; a first OAM message specifies the prefix length to be used for upstream transmissions from the CNU 140-1 to the OCU 130-1 and a second OAM message specifies the prefix length to be used for downstream transmissions from the OCU 130-1 to the CNU 140-1. Alternatively, the same OAM message specifies the upstream and downstream prefix lengths. The messages of steps 5 and 6 use the same long prefix as the messages of steps 1-4 (e.g., long prefix 200, FIG. 2A), because the shorter prefixes are not considered to have been specified until the OCU 130-1 receives the PREFIX_ACK message of step 6.

After step 6, data transfer 302 using prefixes of one or more specified lengths (e.g., prefix 204 and/or prefix 208, FIGS. 2B-2C) occurs between the OCU 130-1 and CNU 140-1 during normal operation. Data transfer 302 may occur in both the upstream and downstream directions. In some embodiments, a first specified prefix length is used for downstream transmission and a second specified prefix length (e.g., longer than the first specified prefix length) is used for upstream transmission. Alternately, the same specified prefix length is used for upstream and downstream transmissions. Subsequent OAM messages between the OCU 130-1 and CNU 140-1 may also use the specified prefix length(s).

Figure 3B:
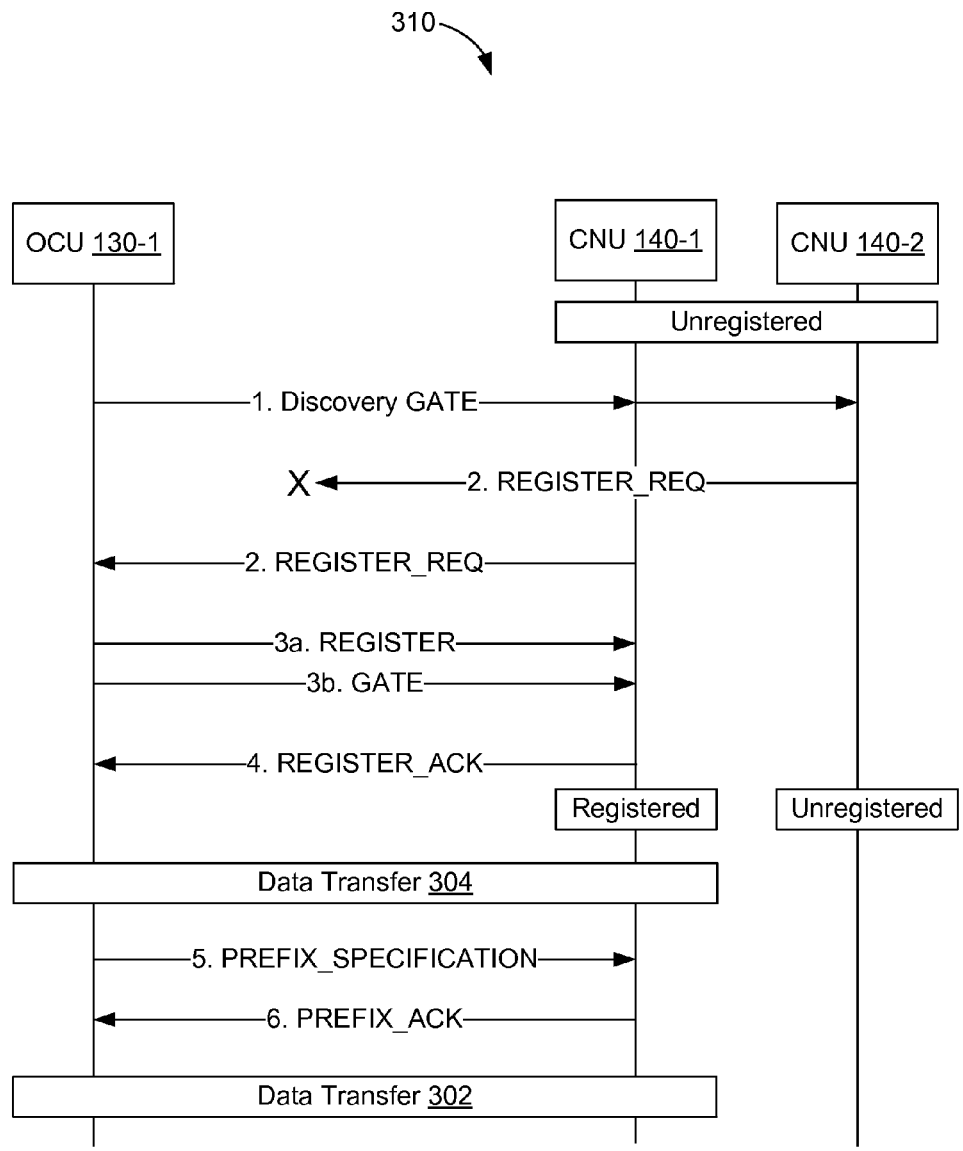

In some embodiments, data transfer 304 between the OCU 130-1 and CNU 140-1 also occurs after registration (e.g., after the discovery mode has ended) but before the OAM messages of steps 5 and 6, as illustrated for a process 310 in FIG. 3B. (OAM messages may be transmitted periodically during the normal mode of operation). The data transfer 304 uses the same default long prefix length(s) as the messages of steps 1-4 (e.g., long prefix 200, FIG. 2A), because the shorter prefix length(s) have not yet been specified.

In alternate embodiments, the prefix length(s) to be used for data transfer 302 between the OCU 130-1 and CNUs 140-1 and 140-2 during normal operation are specified in the discovery mode by one or more discovery messages. For example, a symbol 202 (FIG. 2A) used for the Discovery GATE message (step 1), REGISTER message (step 3a), or GATE message (step 3b) specifies the prefix length(s), and the REGISTER_ACK message (step 4) acknowledges the prefix length specification. Steps 5 and 6 are then omitted.

Figure 4A:
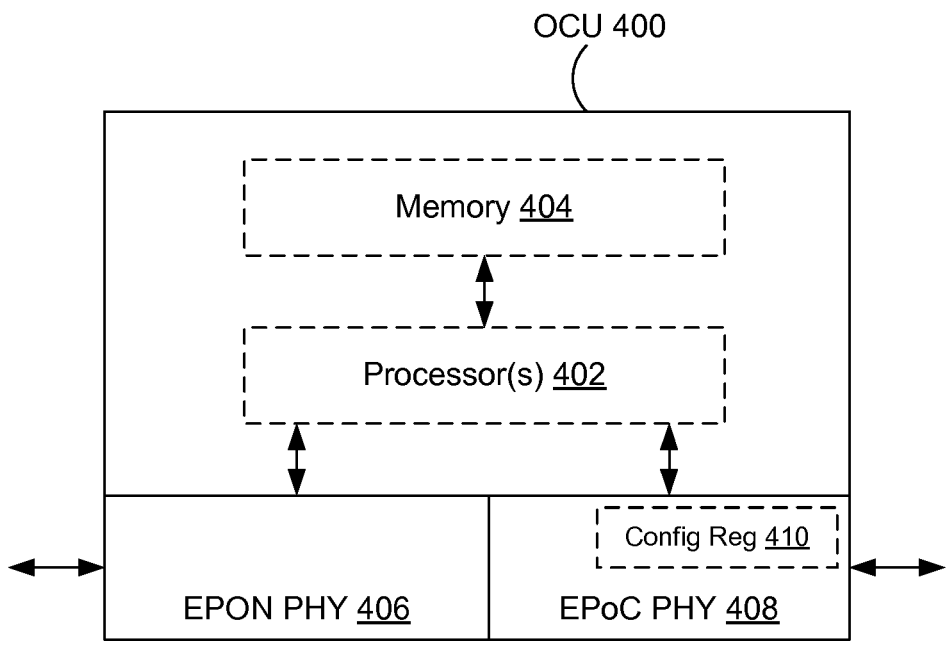
FIG. 4A is a block diagram of an optical-coax unit in accordance with some embodiments.

FIG. 4A is a block diagram of an OCU 400 in accordance with some embodiments. The OCU 400 is an example of an OCU 130 (FIGS. 1A-1B). In the OCU 400, an optical PHY 406 and coax (e.g., EPoC) PHY 408 are coupled to a processor (e.g., one or more processor cores) 402, which is coupled to memory 404. The optical PHY 406 may be part of an ONU 160 (FIG. 1B) and the coax PHY 408 may be part of a CLT 162 (FIGS. 1B-1C). (Alternately, the optical PHY 406 is omitted, and FIG. 4A illustrates a CLT 162 of FIG. 1B or 1C). While the memory 404 is shown as being separate from the processor 402, all or a portion of the memory 404 may be embedded in the processor 402. In some embodiments, the memory 404 includes a non-transitory computer-readable medium (e.g., one or more nonvolatile memory elements, such as EPROM, EEPROM, Flash memory, a hard disk drive, and so on) that stores instructions for execution by the processor 402. These instructions include instructions that, when executed by the processor 402, cause the OCU 400 to transmit messages to, process messages from, and transfer data with CNUs 140 on the cable plant of the OCU 400 (e.g., as illustrated in FIGS. 3A and 3B). For example, these instructions include instructions corresponding to all or a portion of the method 500 (FIG. 5) (e.g., instructions to transmit the packets received by the CNU in the method 500 and to receive and process the packets transmitted by the CNU in the method 500.) The coax PHY 408 includes a configuration register 410 to store values specifying the prefix lengths to be used for transmission during discovery and normal modes, and also specifying the expected prefix lengths for received signals during discovery and normal modes.

Figure 4B:
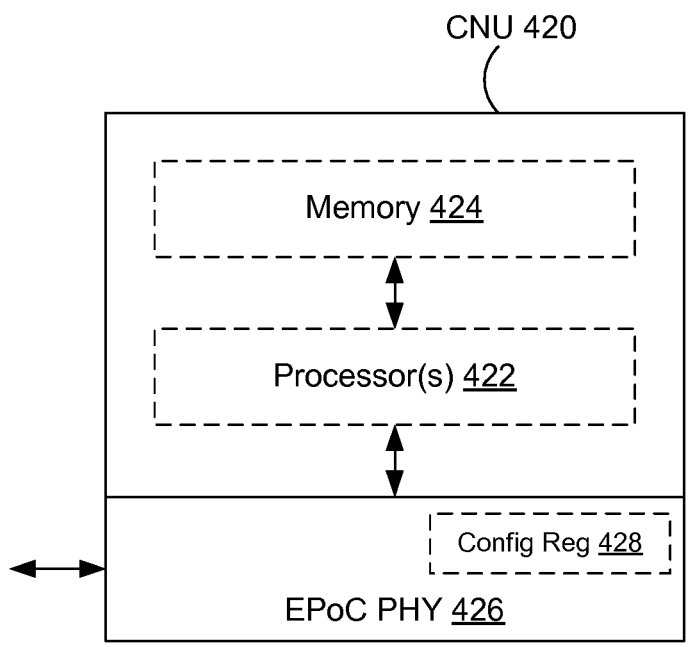
FIG. 4B is a block diagram of a coax network unit in accordance with some embodiments.

FIG. 4B is a block diagram of a CNU 420 in accordance with some embodiments. The CNU 420 is an example of a CNU 140 (FIGS. 1A-1C). In the CNU 420, a coax (e.g., EPoC) PHY 426 is coupled to a processor (e.g., one or more processor cores) 422, which is coupled to memory 424. While the memory 424 is shown as being separate from the processor 422, all or a portion of the memory 404 may be embedded in the processor 422. In some embodiments, the memory 424 includes a non-transitory computer-readable medium (e.g., one or more nonvolatile memory elements, such as EPROM, EEPROM, Flash memory, a hard disk drive, and so on) that stores instructions for execution by the processor 422. When executed by the processor 422, the instructions cause the CNU 420 to transmit messages to, process messages from, and transfer data with the OCU 130 on the cable plant of the CNU 420 (e.g., as illustrated in FIGS. 3A and 3B). For example, these instructions include instructions to perform all or a portion of the method 500 (FIG. 5).

The coax PHY 426 includes a configuration register 428 to store values specifying the prefix lengths to be used for transmission during discovery and normal modes, and also specifying the expected prefix lengths for received signals during discovery and normal modes. Values stored in the register 428 are updated in response to messages from the OCU 130 (e.g., from the CLT 162). For example, a value stored in the register 428 is updated in accordance with the message of step 5 in FIGS. 3A-3B or the message of operation 514 (FIG. 5). In this manner the CNU 420 may be configured in different modes to transmit and receive OFDM symbols with cyclic prefixes of different lengths. For example, the CNU 420 may be configured in this manner to receive one or more message packets that include one or more OFDM symbols with cyclic prefixes of a first length during a discovery mode of operation and to receive data packets that include OFDM symbols with cyclic prefixes of a second length during a normal mode of operation, with the second length being less than the first length.

Figure 5:
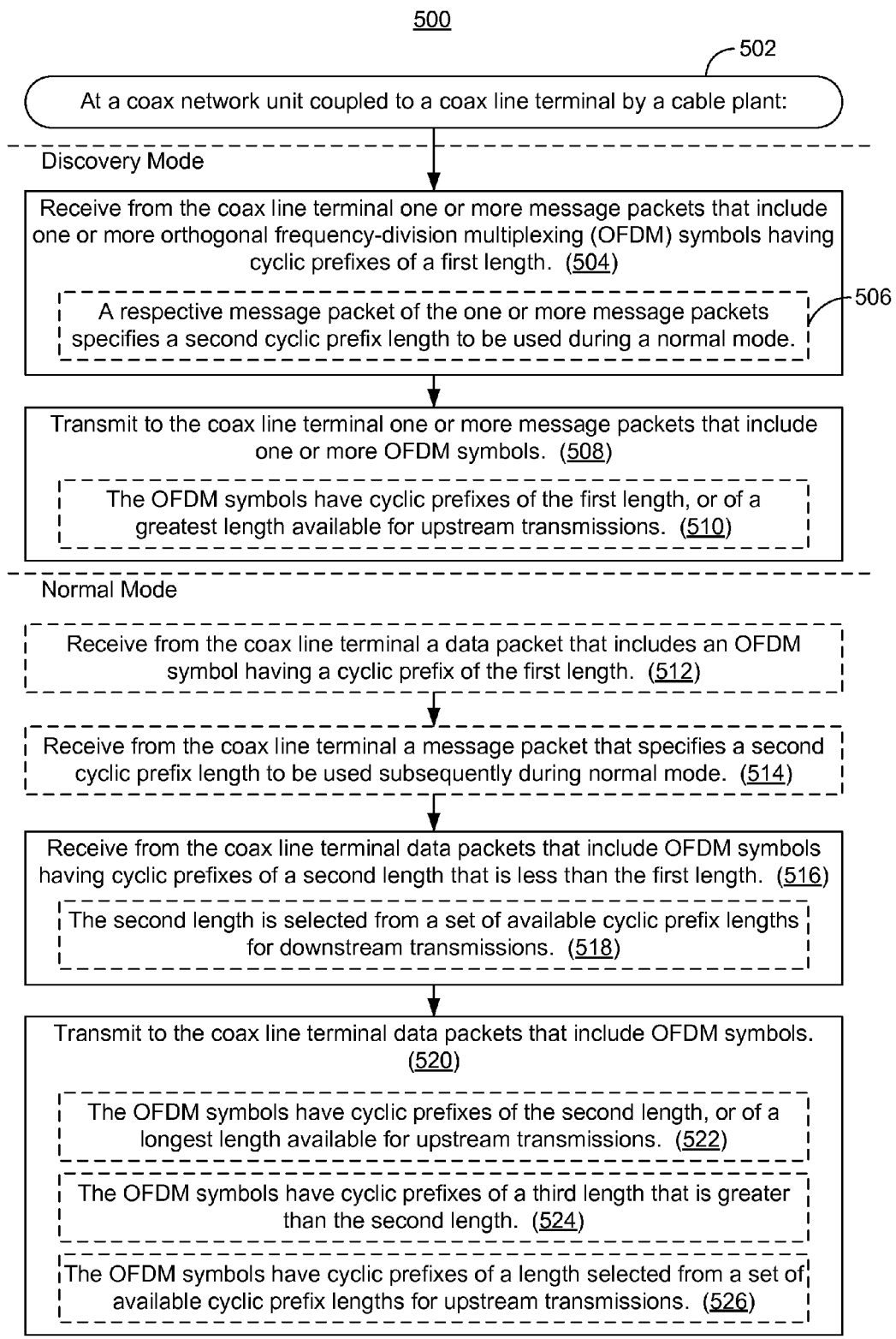
FIG. 5 is a flowchart of a method of operating a coax network unit coupled to a coax line terminal by a cable plant in accordance with some embodiments.

FIG. 5 is a flowchart of a method 500 of operating a CNU 140 (e.g., one of CNUs 140-1 through 140-5, FIGS. 1A-1C) coupled (502) to a CLT 162 (FIGS. 1B-1C) by a cable plant 150 (FIGS. 1B-1C) in accordance with some embodiments. While the method 500 is performed by a CNU 140, an analogous method may be performed by a corresponding CLT 162: the CLT 162 transmits the packets received by the CNU 140 and receives the packets transmitted by the CNU 140.

In a discovery mode of operation, the CNU 140 receives (504) one or more message packets from the CLT 162 that include one or more OFDM symbols. The OFDM symbols of the message packets have cyclic prefixes of a first length (e.g., cyclic prefixes 200, FIG. 2A). For example, the CNU 140 receives discovery GATE, REGISTER, and/or GATE messages (steps 1, 3a, and 3b, FIGS. 3A-3B) that each include an OFDM symbol with a cyclic prefix of the first length.

In some embodiments, a respective message packet of the one or more message packets specifies (506) a second cyclic prefix length to be used during a normal mode of operation. The respective message packet instructs the CNU 140 that data packets in the normal mode of operation will have cyclic prefixes of the second length.

Also in the discovery mode, the CNU 140 transmits (508) to the CLT 162 one or more message packets that include one or more OFDM symbols. For example, the CNU 140 transmits a REGISTER_REQ message and/or a REGISTER_ACK message (steps 2 and 4, FIGS. 3A-3B), each of which includes an OFDM symbol. In some embodiments, the OFDM symbols have (510) cyclic prefixes of the first length. In some embodiments, the OFDM symbols have (510) cyclic prefixes of a greatest length available for upstream transmissions.

In some embodiments, during the normal mode of operation the CNU 140 receives (514) from the CLT 162 a message packet (e.g., the PREFIX_SPECIFICATION message in step 5 of FIGS. 3A-3B) that specifies a second cyclic prefix length to be used subsequently during normal mode. This message packet includes an OFDM symbol with a cyclic prefix of the first length and instructs the CNU that subsequent data packets will have cyclic prefixes of the second length. The operation 514 is performed, for example, as an alternative to the operation 506. In some embodiments, during the normal mode and prior to receiving (514) the message packet that specifies the second prefix length, the CNU 140 receives (512) from the CLT 162 a data packet that includes an OFDM symbol having a cyclic prefix of the first length. Data transfer between the CNU 140 and CLT 162 using OFDM symbols with cyclic prefixes of the first length (e.g., data transfer 304, FIG. 3B) thus may occur in the normal mode prior to specification of the second length.

During the normal mode of operation, the CNU 140 receives (516) from the CLT 162 data packets that include OFDM symbols having cyclic prefixes (e.g., cyclic prefixes 204, FIG. 2B, or 208, FIG. 2C) of the second length, which is less than the first length. In some embodiments, the second length is selected (518) from a set of available cyclic prefix lengths for downstream transmissions.

Also during the normal mode of operation, the CNU 140 transmits (520) data packets that include OFDM symbols to the CLT 162. In some embodiments, these OFDM symbols have (522) cyclic prefixes of the second length, or of a longest length available for upstream transmissions. Alternatively, these OFDM symbols have (524) cyclic prefixes of a third length that is greater than the second length. Prior to using cyclic prefixes of the third length in data packet transmissions, the CNU 140 receives a message from the CLT 162 instructing the CNU 140 to use the cyclic prefixes of the third length when transmitting data packets. In some embodiments, these OFDM symbols have cyclic prefixes of a length selected (526) from a set of available cyclic prefix lengths for upstream transmissions.

While the method 500 includes a number of operations that appear to occur in a specific order, it should be apparent that the method 500 can include more or fewer operations, some of which can be executed serially or in parallel. An order of two or more operations may be changed and two or more operations may be combined into a single operation.

In the foregoing specification, the present embodiments have been described with reference to specific exemplary embodiments thereof. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense.

What is claimed is:

1. A method of operating a coax network unit coupled to a coax line terminal by a cable plant, the method comprising:
   in a discovery mode of operation:
      receiving from the coax line terminal a discovery message to trigger registration of the coax network unit, the discovery message comprising an orthogonal frequency-division multiplexing (OFDM) symbol having a cyclic prefix of a first length; and
   in a normal mode of operation subsequent to the discovery mode:
      receiving from the coax line terminal data packets comprising OFDM symbols that have cyclic prefixes of a second length, the second length being less than the first length.

2. The method of claim 1, further comprising, in the discovery mode, responding to the discovery message with a registration request message.

3. The method of claim 2, wherein the registration request message comprises an OFDM symbol having a cyclic prefix of the first length.

4. The method of claim 2, wherein the registration request message comprises an OFDM symbol having a longest cyclic prefix available for upstream transmissions from the coax network unit to the coax line terminal.

5. The method of claim 2, further comprising, in the discovery mode, receiving a registration message and a gate message in response to the registration request message, the registration and gate messages each comprising an OFDM symbol having a cyclic prefix of the first length.

6. The method of claim 5, further comprising transmitting an acknowledgement message in response to the registration message and gate message.

7. The method of claim 6, wherein the acknowledgement message comprises an OFDM symbol having a cyclic prefix of the first length.

8. The method of claim 6, wherein the acknowledgement message comprises an OFDM symbol having a longest cyclic prefix available for upstream transmissions from the coax network unit to the coax line terminal.

9. The method of claim 1, further comprising receiving from the coax line terminal a prefix specification message comprising an OFDM symbol having a cyclic prefix of the first length, wherein the prefix specification message instructs the coax network unit that the data packets will have cyclic prefixes of the second length.

10. The method of claim 9, wherein:
the prefix specification message is received in the normal mode of operation; and
the method further comprises, in the normal mode of operation and prior to receiving the prefix specification message, receiving a data packet comprising an OFDM symbol having a cyclic prefix of the first length.

11. The method of claim 1, further comprising receiving a message packet in the discovery mode that instructs the coax network unit that the data packets will have cyclic prefixes of the second length.

12. The method of claim 1, further comprising, in the normal mode of operation, transmitting data packets comprising OFDM symbols to the coax line terminal via the cable plant, wherein the OFDM symbols of the transmitted data packets have cyclic prefixes of a third length distinct from the second length.

13. The method of claim 12, further comprising, prior to transmitting the data packets comprising OFDM symbols having cyclic prefixes of the third length, receiving from the coax line terminal a message that instructs the coax network unit to use cyclic prefixes of the third length when transmitting data packets.

14. The method of claim 13, wherein the message that instructs the coax network unit to use cyclic prefixes of the third length comprises an OFDM symbol having a cyclic prefix of the first length.

15. The method of claim 12, wherein the third length is greater than the second length.

16. The method of claim 12, wherein:
the first and second lengths are selected from a set of cyclic prefix lengths available for downstream transmissions from the coax line terminal to the coax network unit; and
the third length is selected from a set of cyclic prefix lengths available for upstream transmissions from the coax network unit to the coax line terminal.

17. The method of claim 1, wherein:
the first and second lengths are selected from a set of available cyclic prefix lengths; and
the first length is the greatest length of the set.

18. A coax network unit, comprising:
a transmitter to transmit packets comprising OFDM symbols to a coax line terminal; and
a receiver to receive packets comprising OFDM symbols from the coax line terminal;
wherein the receiver is configurable to receive one or more message packets comprising one or more OFDM symbols with cyclic prefixes of a first length during a discovery mode of operation, the one or more message packets comprising a discovery message to trigger registration of the coax network unit, and to receive data packets comprising OFDM symbols with cyclic prefixes of a second length during a normal mode of operation, the second length being less than the first length; and
wherein the discovery message comprises an OFDM symbol having a cyclic prefix of the first length.

19. The coax network unit of claim 18, wherein the transmitter is configurable to transmit packets comprising OFDM symbols with cyclic prefixes of a length to be selected from a set of available cyclic prefix lengths.

20. The coax network unit of claim 18, further comprising:
one or more processors; and
memory storing instructions that, when executed by the one or more processors, cause the coax network unit to configure the receiver to receive the OFDM symbols with the cyclic prefixes of the second length, in response to a message packet from the coax line terminal specifying use of the second length during the normal mode.

21. A method of operating a coax network unit coupled to a coax line terminal by a cable plant, the method comprising:
in a discovery mode of operation:
receiving from the coax line terminal one or more message packets comprising one or more orthogonal frequency-division multiplexing (OFDM) symbols that have cyclic prefixes of a first length; and
in a normal mode of operation subsequent to the discovery mode:
receiving from the coax line terminal data packets comprising OFDM symbols that have cyclic prefixes of a second length, the second length being less than the first length, and
transmitting data packets comprising OFDM symbols to the coax line terminal, wherein the OFDM symbols of the transmitted data packets have cyclic prefixes of a third length distinct from the second length;
wherein the first and second lengths are selected from a set of cyclic prefix lengths available for downstream transmissions from the coax line terminal to the coax network unit; and
wherein the third length is selected from a set of cyclic prefix lengths available for upstream transmissions from the coax network unit to the coax line terminal.

22. The method of claim 21, wherein receiving the one or more message packets in the discovery mode comprises receiving a discovery message to trigger registration of the coax network unit, the discovery message comprising an OFDM symbol having a cyclic prefix of the first length.

23. The method of claim 22, further comprising, in the discovery mode, responding to the discovery message with a registration request message comprising an OFDM symbol having a cyclic prefix of the first length.

24. The method of claim 21, further comprising, in the normal mode of operation:

receiving from the coax line terminal a prefix specification message comprising an OFDM symbol having a cyclic prefix of the first length, wherein the prefix specification message instructs the coax network unit that received data packets will have cyclic prefixes of the second length; and prior to receiving the prefix specification message, receiving a data packet comprising an OFDM symbol having a cyclic prefix of the first length.

25. The method of claim 21, further comprising, prior to transmitting the data packets comprising OFDM symbols having cyclic prefixes of the third length, receiving from the coax line terminal a message that instructs the coax network unit to use cyclic prefixes of the third length when transmitting data packets.

26. The method of claim 25, wherein the message that instructs the coax network unit to use cyclic prefixes of the third length comprises an OFDM symbol having a cyclic prefix of the first length.

27. A coax network unit, comprising:
a transmitter to transmit packets comprising OFDM symbols to a coax line terminal; and
a receiver to receive packets comprising OFDM symbols from the coax line terminal; wherein:
the receiver is configurable to receive one or more message packets comprising one or more OFDM symbols with cyclic prefixes of a first length during a discovery mode of operation and to receive data packets comprising OFDM symbols with cyclic prefixes of a second length during a normal mode of operation, the second length being less than the first length;
the transmitter is configurable in the normal mode of operation to transmit data packets comprising OFDM symbols with cyclic prefixes of a third length distinct from the second length;
the first and second lengths are selected from a set of cyclic prefix lengths available for downstream transmissions from the coax line terminal to the coax network unit; and
the third length is selected from a set of cyclic prefix lengths available for upstream transmissions from the coax network unit to the coax line terminal.

28. The coax network unit of claim 27, further comprising:
one or more processors; and
memory storing instructions that, when executed by the one or more processors, cause the coax network unit to configure the receiver to receive the OFDM symbols with the cyclic prefixes of the second length, in response to a message packet from the coax line terminal specifying use of the second length during the normal mode.

29. The coax network unit of claim 28, wherein the memory further stores instructions that, when executed by the one or more processors, cause the coax network unit to configure the transmitter to transmit the OFDM symbols with the cyclic prefixes of the third length, in response to a message packet from the coax line terminal specifying use of the third length during the normal mode.

* * * * *